Nov. 14, 1961     A. R. BRAULT ET AL     3,008,371
ELECTRIC MOTOR WOUND SPRING MOTOR AND CAMERA MECHANISM
Filed May 13, 1958     3 Sheets-Sheet 3
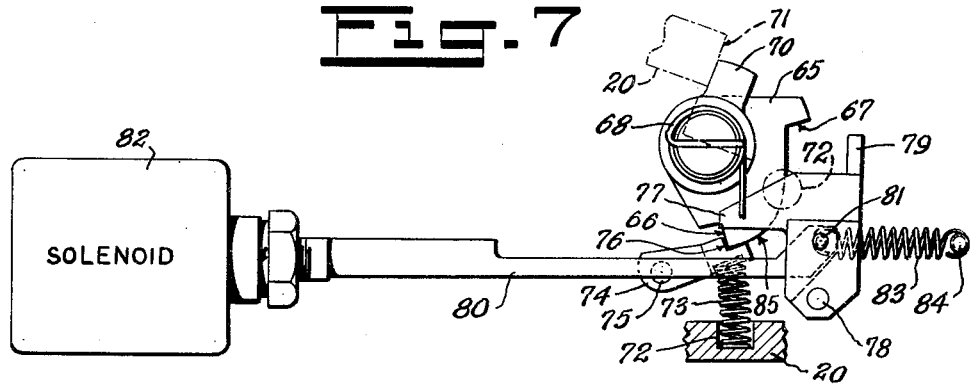
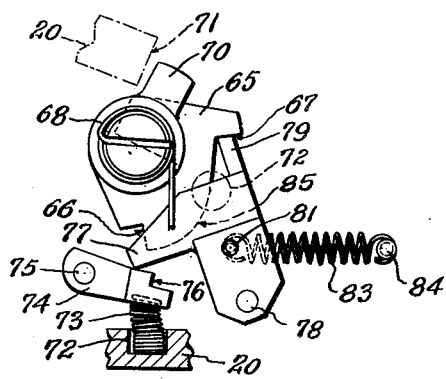
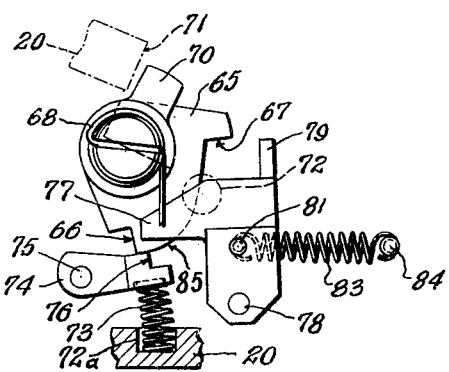
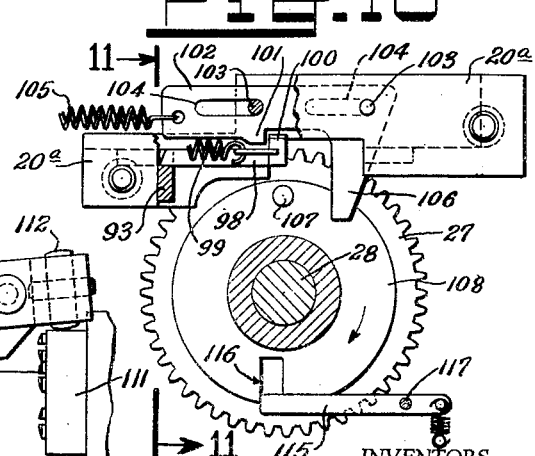
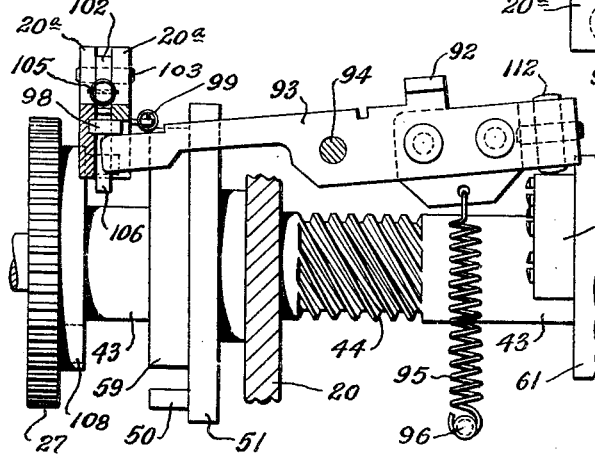
INVENTORS
ANDRE R. BRAULT
RALPH LINDBERG
BY
ATTORNEYS

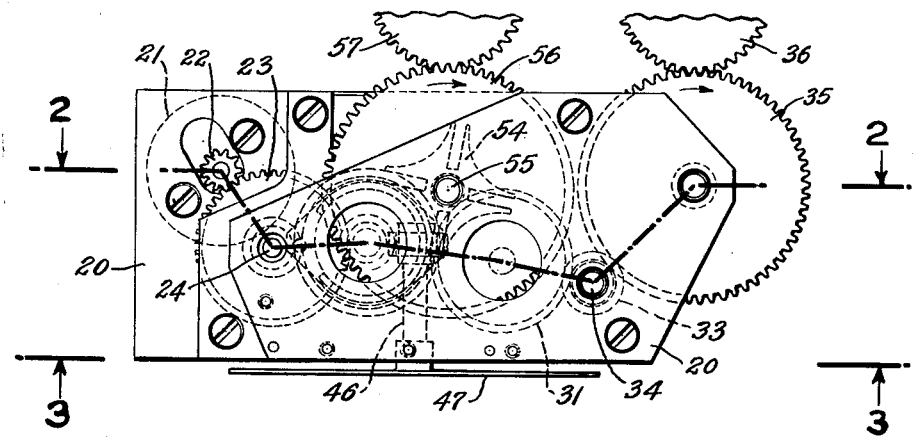
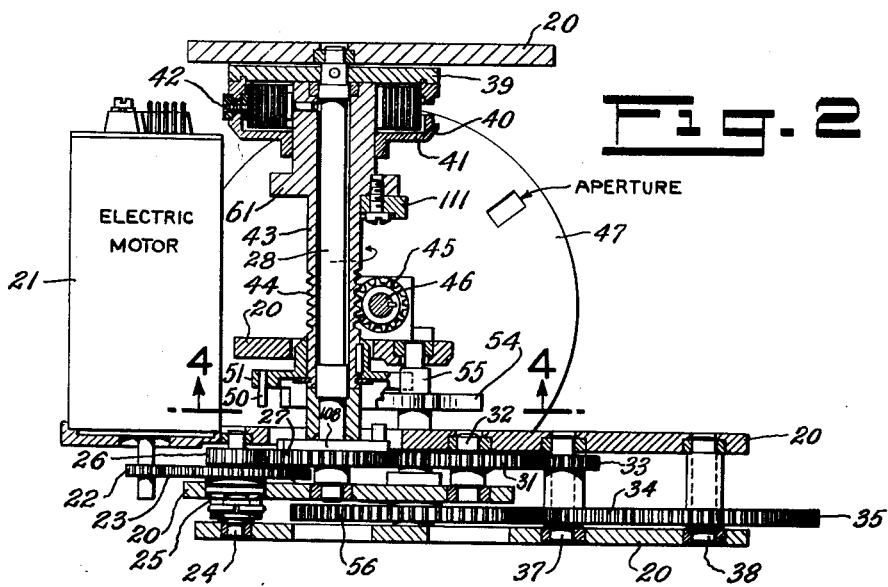
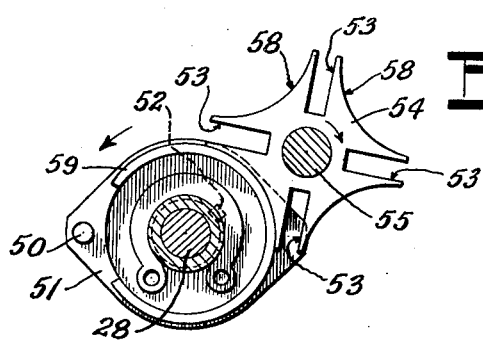

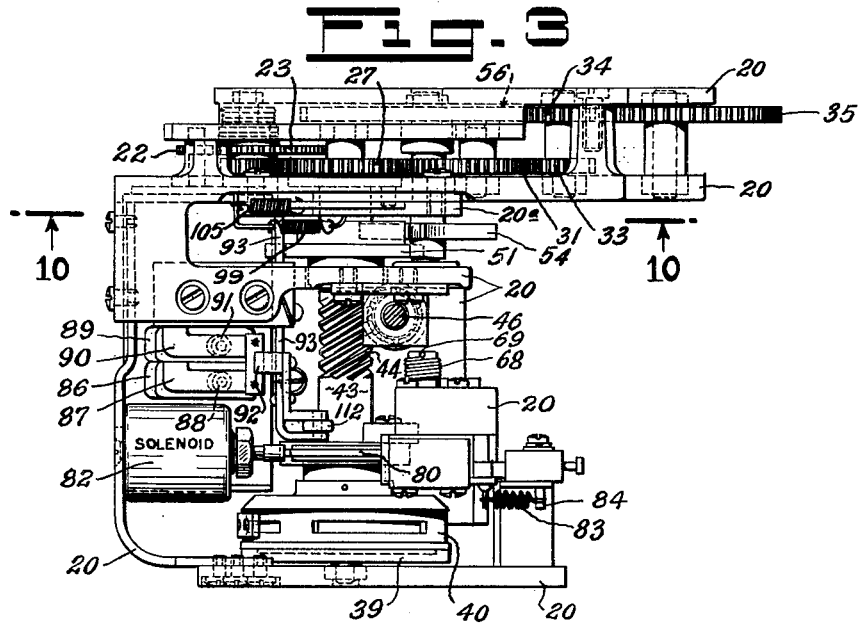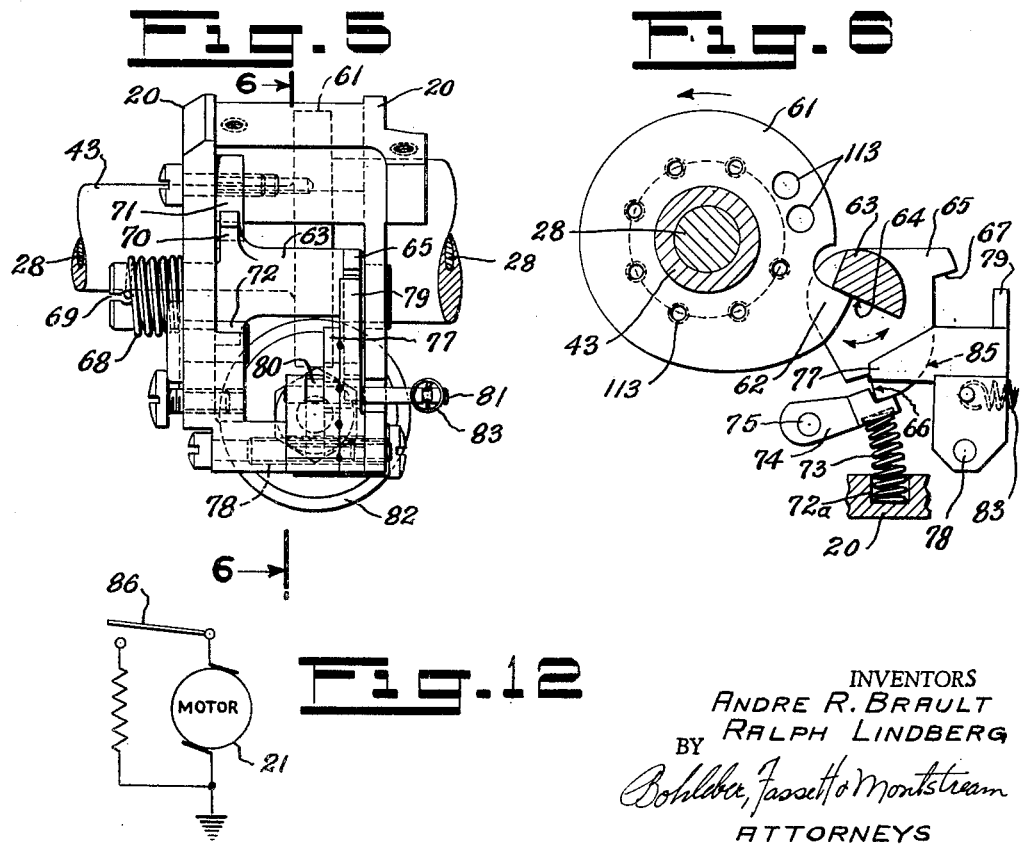

United States Patent Office 3,008,371
Patented Nov. 14, 1961

3,008,371
ELECTRIC MOTOR WOUND SPRING MOTOR
AND CAMERA MECHANISM
Andre R. Brault, Merrick, and Ralph Lindberg, Malba, N.Y., assignors to OPTOmechanisms, Inc., Mineola, N.Y., a corporation of New York
Filed May 13, 1958, Ser. No. 734,942
25 Claims. (Cl. 88—18)

The invention relates to a camera mechanism having general application but is particularly suited for photographing the screen of a cathode ray tube on which a radar picture appears. A camera for this purpose must be very high speed and the camera to be described herein is an improvement on the construction described and illustrated in our application Serial Number 598,786, filed July 19, 1956. This camera is one which uses a spring motor to drive the shutter and the film transport mechanism which moves the short length of exposed film from exposure position and hence moves an unexposed portion of the film to exposure position. The spring motor is rewound by an electric motor which latter also feeds the unexposed film into a loop on one side of exposure position and takes up the loop of exposed film on the other side during the rewinding of the spring motor by the electric motor. The construction herein reduces the number of idler gears and further simplifies and improves the construction of the earlier application as well as substantially reducing the inertia of the parts driven by the spring motor.

It is an object of the invention to construct a high speed camera which is driven by a spring motor which has a minimum of inertia and substantially reduces the inertia of the driven mechanism of the earlier construction.

Another object of the invention is to construct a high speed camera in which the locking mechanism is a pivoted shoulder with the shoulder being extremely close to its center of rotation or oscillation.

Another object is to drive the Geneva wheel for the film transport directly from the driven shaft or arbor.

Another object is to construct a simplified release mechanism for the locking mechanism which locks the spring motor against rotation.

Another object is to construct an improved switch operating mechanism for the electric motor circuit.

Other objects will be more apparent from the following description when taken in connection with the accompanying drawings illustrating a preferred embodiment thereof in which:

FIG. 1 is a side elevation of the camera;
FIG. 2 is a sectional view taken on line 2—2 of FIG. 1;
FIG. 3 is a bottom view taken on line 3—3 of FIG. 1;
FIG. 4 is a view of the Geneva mechanism taken on line 4—4 of FIG. 2;
FIG. 5 is an enlarged view of the locking mechanism and the release mechanism;
FIG. 6 is an enlarged view of the locking and release mechanism taken on line 6—6 of FIG. 5 showing its relation with the locking disk;
FIG. 7 is a view of the release mechanism and the locking mechanism in locked position and the former being solenoid operated;
FIG. 8 is a view similar to FIG. 7 with the release mechanism in the first or priming step of its release operation of the locking mechanism;
FIG. 9 is a view similar to FIG. 8 showing the second step in the release of the locking mechanism;
FIG. 10 is an enlarged view of the switch resetting mechanism;
FIG. 11 is an enlarged view of the switch resetting mechanism and the switch operator taken on line 11—11 of FIG. 10; and
FIG. 12 is a diagramatic view of the switch circuit.

The camera includes a frame 20 which preferably comprises all of the frame elements secured together making up the entire frame. On this frame is mounted an electric motor 21 which is connected with one end of the spring motor through driving mechanism to wind the spring motor. The driving mechanism includes a pinion 22 on the electric motor shaft which meshes with a gear 23. This gear is connected to a shaft 24 through a safety or overload clutch 25 of any suitable kind. The shaft 24 carries a pinion 26 which meshes with a gear 27 which gear is secured on a main or driving shaft 28. As will appear the spring motor is rewound by the electric motor through the driving mechanism including the main shaft 28.

Film feed mechanism is provided to feed and take-up film as described in the earlier application directly from the electric motor. When the electric motor is rewinding the spring motor, the film feed mechanism forms a loop of unexposed film on one side of exposure position from a film supply reel and a loop of exposed film is withdrawn or taken up from the exposed or other side and wound up on a take-up reel which reels are also rotated to feed the film loop and to withdraw the film loop by direct connection with the electric motor. This film feed mechanism includes a gear 31 carried on a shaft 32 journaled in the frame which gear meshes with a pinion 33 carried on a shaft 37 journaled in the frame which shaft also carries a second pinion 34 which meshes with a film feed gear 35 carried on a shaft 38. This gear meshes with a driven gear 36 which forms part of a film feed mechanism. This film feed gear and hence the film feed mechanism is directly connected with the electric motor so that it and not the spring motor drives the film feed mechanism. This removes the mass and inertia of these parts from the spring motor.

The main or driving shaft 28 is secured to a spring motor housing including an end plate 39 and a cover 40 to which housing one end of the spring motor 41 is secured in any suitable manner such as by the securing means 42. The spring motor shown is a coil spring 41 and its inner end is secured in any suitable manner to an arbor or driven shaft 43 through which the main or driving shaft 28 projects. The housing 40 is rotatable freely on this driven shaft. A shutter is connected with the driven shaft through a worm 44 on the driven shaft and this worm meshes with a worm wheel 45 carried on a shutter shaft 46 which shaft carries a shutter 47. When the spring motor unwinds and drives the driven shaft 43 through one revolution, the shutter is rotated on exposure. The shutter has an aperture which passes through the light path between a camera lens and the exposure position for the film.

Film transport mechanism is also driven by the driven shaft 43 and hence by the spring motor which includes a Geneva (FIG. 4) comprising a driving pin 50 carried by a disk 51 which is secured to the driven shaft such as by a key 52. This pin engages in a slot 53 of the Geneva wheel 54 and with four such slots turns the Geneva wheel through 90°. The Geneva wheel is carried on a shaft 55 on which shaft is carried a gear 56 (FIG. 1) and this gear meshes with a film transport gear 57. This gear transports the film at film exposure position only and therefore transports a short length of film only. In so doing a loop of unexposed film is taken up from the film feed side of exposure position and transported to exposure position and the transport of the film results in a loop of exposed film on the film take-up side of exposure position. The Geneva wheel has the usual arcuate surface 58 between slots which with the flange locks the Geneva wheel against rotation except when the pin 50 and disk 51 are rotated so that the pin passes through a slot 53. A quarter turn of the Geneva wheel transports the short length of film at exposure position.

Locking means for the spring motor is provided so that it is normally held in wound condition until it is released whereupon the spring motor drives the shutter, the film transport mechanism and the switch resetting means which is driven by the spring motor. The locking means is shown in FIGS. 5 through 9 which includes a locking member 61 in the form of a disk carried by the driven shaft 43 and shown, as integral therewith. This locking member has main locking shoulder 62 which is engaged by a locking catch 63 and which is rotatable or oscillatable in the frame 20 on the center 64. It will be observed therefore that the locking catch is engaged by the locking member or shoulder 62 very close to the center of oscillation of the catch. This reduces the inertia of this part to a minimum and makes it rapid in release action. Carried on the locking catch is a locking plate 65 which has locking shoulder means preferably comprising a pair of spaced locking shoulders such as a first locking shoulder 66 and a second locking shoulder 67. A coil spring 68 has one end secured in a slot 69 in the end of the locking member and the other end secured to the frame 20 to normally propel the locking catch 63 in a counterclockwise direction as viewed in FIG. 6. The locking catch also carries a stop 70 which limits the pivotal movement of the catch in a counterclockwise direction by engaging a shoulder 71 carried by the frame 20 and in the opposite direction by engaging a stop pin 72 carried by the frame.

The locking catch 63 and locking plate 65 are held in locking position by locking means including a pawl 74 which is pivotally mounted on a pin 75 carried by the frame. This pawl has a shoulder 76 which engages locking shoulder means and particularly the first locking shoulder 66. The pawl is held in engaged position by a spring 73 set in a hole 72a in the frame. This locking pawl is wider than the locking plate 65 and is tripped or moved out of locking engagement with the shoulder 66 by an ejector 77 which is pivotally carried on a pivot 78 carried by the frame 20. The ejector also operates and as particularly shown carries a secondary locking pawl 79 which cooperates with the locking shoulder means or particularly the second locking shoulder 67 as will appear. The ejector and secondary locking pawl carry a pin 81 connected by a rod 80 with the armature of a solenoid 82. A spring 83 having one end anchored to a pin 84 and the other end anchored to pin 81 normally retains the parts in the inoperative position of FIG. 7.

In operation a pulse is fed to the solenoid so that the armature rod 80 is pulled to the left as shown in FIG. 7. This pivots the ejector 77 so that it engages the first locking pawl 74 and removes it from contact with the first locking shoulder 66. At the same time the second locking pawl 79 moves into position to be engaged by the second locking shoulder 67 as shown in FIG. 8. The locking catch 63 and locking plate 65 is turned somewhat in this operation by the pressure of the spring motor acting through shoulder 62 and catch 63 so that pawl 79 is engaged by shoulder 67. When the solenoid energizing pulse ceases, the spring 83 restores the ejector and pawl 79 to its initial or release position. Since the locking plate 65 has turned sufficiently so that the pawl 76 engages or rides on the surface 85 of the locking plate as shown in FIG. 9, it cannot engage with its locking shoulder 66. With the second locking pawl 79 withdrawn from contact with the locking shoulder 67, the locking plate 65 and catch 63 are released for rotation in a clockwise direction. The tension of the spring motor is substantially greater than the tension of the coil spring 69 so that the spring motor forces the locking catch 63 to rotate clockwise as viewed in FIG. 6 against the tension of the coil spring 69 and releases the locking member 61 for rotation in a counterclockwise direction. When the shoulder 62 on the locking member no longer engages the locking catch 63, the coil spring 69 returns the catch 63 to locking position whereupon the locking pawl 74 comes into engagement with the locking shoulder 66 and secures the catch in locking position. When the locking shoulder 62 on the locking member engages the catch it has made one revolution and is locked ready for a second operation. A stop abutment 72 is carried by the frame 20 which may be engaged by the stop 70 to prevent over turning of the locking catch 63 and locking plate 65.

Switch operating mechanism (FIGS. 3, 10 and 11) is provided to energize the electric motor. The motor is energized by a micro-switch 86 which is operated by a spring switch operator 87 which operator engages a switch button 88. A second micro-switch 89 is operated by a spring switch operator 90 engaging its switch button 91. Both operators are depressed by a tongue 92 carried by a switch lever 93 which is pivotally mounted on a pin 94 carried by the frame 20. A spring 95 having one end attached to the lever and the other end anchored to a pin 96 carried by the frame, normally propels the lever downwardly as viewed in FIG. 11.

The switch lever 93 is held in the position shown in FIG. 11 by a sliding or switch lever catch 98 which is slidable in grooves in auxiliary frame members 20a. This sliding catch is normally propelled to stop or lever engaging position by a spring 99 and has a projection 100 which is engaged by a projection 101 carried by an operating slider 102. This operating slider is mounted on pins 103 which are secured in the auxiliary frame 20a and which pins are received in slots 104 in the slider. A spring 105 normally propels the slider to the left as viewed in FIG. 10. The operating slider carries a finger 106 which is in a position to be engaged by a pin 107 carried by a disk 108 secured to the main or driving shaft 28 or may be secured to the gear 27 or both.

The electric circuit is the same as that shown in FIGURES 9, 10 of our aforesaid application, including the switch of FIG. 6. When the spring motor catch is released, the spring motor begins to turn the driven shaft 43. A cam operated by the driven mechanism and shown particularly as carried by the locking member 61 engages a cam roller 112 on the switch lever 93 which propels the right hand end of this lever upwardly and this depresses the left hand end so that the spring 99 propels the sliding catch 98 into position above the switch lever. The switch operating lever 93 is therefore locked in switch operated position. With electric motor switch 86 closed, the electric motor 21 is energized and turns the driving mechanism whereupon the pin 107 engages the finger 106 and propels it to the right as viewed in FIG. 10. This movement pulls the sliding catch 98 to the right so that it is removed from a position above the switch lever 93 and the left hand end as viewed in FIG. 11 rises under the influence of the spring 95. The right hand end of the switch lever pivots downwardly which moves the tongue 92 downwardly and closes microswitch 89 and opens motor switch 86 which is connected with and controls energization of the electric motor. While the switch 86 is closed, the electric motor rotates and it starts to rewind the spring motor even while the latter is driving the driven shaft 43. When the driven shaft 43 has made a partial revolution and before switch 86 opens, a switch (96 shown in FIG. 6 of the aforesaid application) in parallel with switch 86 closes and continues energization of the electric motor for a full revolution of this shaft whereupon the switch opens. The locking member 61 (FIG. 6) has holes 113 located so that the cam may be mounted at the better time or position thereon for operation of the switch means.

A pawl 115 (FIG. 10) pivoted at 117 may be used which engages a stop shoulder 116 carried by the disk 108 in order to assure that there be no reverse unwinding of the spring motor. The back resistance from the spring motor to the electric motor usually is sufficient to prevent back unwinding, however, the pawl assures that this will not take place. A spring 118 propels the pawl into engaging position.

The camera drive mechanism herein reduces materially the number of parts particularly in the driven mechanism of applicants' prior construction and hence reduces substantially the inertia resistances which must be overcome by the spring motor in starting to drive this mechanism. Reduction in the number of parts also reduces the cost of manufacture. Furthermore by reducing the mass of the locking catch by application at or adjacent is pivotal axis, additional inertia resistances are reduced as well as more rapid release action.

This invention is presented to fill a need for improvements in an electric motor wound spring motor and camera mechanism. It is understood that various modifications in structure, as well as changes in mode of operation, assembly, and manner if use, may and often do occur to those skilled in the art, especially after benefiting from the teachings of an invention. This disclosure illustrates the preferred means of embodying the invention in useful form.

What is claimed is:

1. A device of the character described comprising a spring motor having ends, an electric motor, driving mechanism connecting the electric motor with one end of the spring motor to wind the latter; driven mechanism connected with the other end of the spring motor including a locking member to lock the driven mechanism and releaseable to permit one revolution of the locking member, and a locking shoulder carried by the locking member; a pivoted locking catch having a pivotal axis, the locking shoulder engaging the locking catch to retain the spring motor inoperative and engaging the locking catch adjacent its pivotal axis, spring means pivoting the locking catch to locking position, the spring means having a tension substantially less than the wound tension of the spring motor, means locking the locking catch in locking position, means to release the locking means, switch means electrically connected with the electric motor, means operatively connected with the driven mechanism to close the switch means and means operatively connected with the driving mechanism to open the switch means.

2. A device as in claim 1 in which the locking means includes a first locking means and a second locking means, the release means having a release movement and a return movement and releasing the first locking means and simultaneously setting the second locking means and releasing the second locking means on the return movement.

3. A device as in claim 1 in which the locking means includes a pair of spaced locking shoulders, engaging one of the locking shoulders, the release means including a pivoted ejector movable to remove the locking pawl from engagement with its locking shoulder, and the pivoted ejector carrying a secondary locking pawl movable into engagement with the other of the pair of locking shoulders upon release of the locking pawl and removable from engagement therewith upon return movement of the ejector.

4. A device as in claim 3 in which the secondary locking pawl is initially spaced a short distance from its locking shoulder thereby permitting a short rotation of the locking catch upon release of the locking means.

5. A device as in claim 3 in which the locking catch has a riding surface engaged by the locking means when released by the ejector.

6. A device as in claim 1 including a pivoted switch lever operatively connected with the switch means, means carried by the driven mechanism to pivot the switch lever to operate the switch means, a switch lever catch locking the switch lever in operated position, and means carried by the driving mechanism and operating the switch lever catch to release the switch lever when the spring motor is rewound.

7. A device as in claim 6 including an operating slider operatively connected with the switch lever catch and having a finger, and a pin carried by the driving mechanism and engaging the finger to release the switch lever catch when the spring motor is rewound.

8. A device as in claim 1 in which the means to close the switch means is a cam carried by the locking member.

9. A camera mechanism comprising a spring motor having ends, an electric motor; driving mechanism connecting the electric motor with one end of the spring motor to wind the latter, and including a gear adapted to be connected with film feed means; driven mechanism connected with the other end of the spring motor including a Geneva mechanism, a gear connected with the Geneva mechanism and adapted to be connected with a film transport means, a shutter, a locking member to lock the driven mechanism and releaseable to permit one revolution of the locking member, and a locking shoulder carried by the locking member; a pivoted locking catch having a pivotal axis, the locking shoulder engaging the locking catch to retain the spring motor inoperative and engaging the locking catch adjacent its pivotal axis, spring means pivoting the locking catch to locking position, the spring means having a tension substantially less than the wound tension of the spring motor, means locking the locking catch in locking position, means to release the locking means, switch means electrically connected with the electric motor, means operatively connected with the driven mechanism to close the switch means and energize the motor to drive the driving mechanism, and means operatively connected with the driving mechanism to open the switch means when the spring motor is wound.

10. A camera mechanism as in claim 9 in which the driven mechanism includes a driven shaft, a worm carried by the driven shaft, and a worm gear meshing with the worm and connected with the shutter.

11. A camera mechanism as in claim 9 in which the locking means includes a first locking means and a second locking means, the release means having a release movement and a return movement and releasing the first locking means upon the release movement and simultaneously setting the second locking means and releasing the second locking means on the return movement.

12. A camera mechanism as in claim 9 in which the locking means includes a pair of spaced locking shoulders carried by the locking catch, a first locking pawl engaging one of the locking shoulders, the release means including a pivoted ejector movable to remove the locking pawl from engagement with its locking shoulder, and the pivoted ejector carrying a second locking pawl movable into engagement with the other of the pair of locking shoulders upon release of the locking means and removable from engagement therewith upon return movement of the ejector.

13. A camera mechanism as in claim 12 in which the secondary locking pawl is initially spaced a short distance from its locking shoulder thereby permitting a short rotation of the locking catch upon release of the first locking pawl.

14. A camera mechanism as in claim 12 in which the locking catch has a riding surface engaged by the first locking pawl when released by the ejector.

15. A camera mechanism as in claim 9 including a pivoted switch lever operatively connected with the switch means, means carried by the driven mechanism to pivot the switch lever to operate the switch means, a switch lever catch locking the switch lever in operated position, and means carried by the driving mechanism and operating the switch lever catch to release the switch lever when the spring motor is rewound.

16. A camera mechanism as in claim 15 including an operating slider operatively connected with the switch lever catch and having a finger, and a pin carried by the driving mechanism and engaging the finger to release the switch lever catch when the spring motor is rewound.

17. A camera mechanism as in claim 9 in which the means to close the switch means is a cam carried by the locking member.

18. A device of the character described comprising a spring motor having ends, an electric motor, driving mechanism connecting the electric motor with one end of the spring motor to wind the latter; driven mechanism connected with the other end of the spring motor including a locking member to lock the driven mechanism and releasable to permit one revolution of the locking member, and a locking shoulder carried by the locking member; a second driven mechanism connected with the driving mechanism and operated by the electric motor; a pivoted locking catch having a pivotal axis, the locking shoulder engaging the locking catch to retain the spring motor inoperative and engaging the locking catch adjacent the pivotal axis, spring means pivoting the locking catch to locking position, the spring means having a tension substantially less than the wound tension of the spring motor, means locking the locking catch in locking position, means to release the locking means, switch means electrically connected with the electric motor, means operatively connected with the driven mechanism to close the switch means, and means operatively connected with the driving mechanism to open the switch means.

19. A device as in claim 18 in which the locking means includes a first locking means and a second locking means, the release means having a release movement and a return movement and releasing the first locking means and simultaneously setting the second locking means and releasing the second locking means on the return movement.

20. A device as in claim 18 in which the locking means includes a pair of spaced locking shoulders, engaging one of the locking shoulders, the release means including a pivoted ejector movable to remove the locking pawl from engagement with its locking shoulder, and the pivoted ejector carrying a secondary locking pawl movable into engagement with the other of the pair of locking shoulders upon release of the locking pawl and removable from engagement therewith upon return movement of the ejector.

21. A device as in claim 20 in which the secondary locking pawl is initially spaced a short distance from its locking shoulder thereby permitting a short rotation of the locking catch upon release of the locking means.

22. A device as in claim 20 in which the locking catch has a riding surface engaged by the locking means when released by the ejector.

23. A device as in claim 18 including a pivoted switch lever operatively connected with the switch means, means carried by the driven mechanism to pivot the switch lever to operate the switch means, a switch lever catch locking the switch lever in operated position, and means carried by the driving mechanism and operating the switch lever catch to release the switch lever when the spring motor is rewound.

24. A device as in claim 23 including an operating slider operatively connected with the switch lever catch and having a finger, and a pin carried by the driving mechanism and engaging the finger to release the switch lever catch when the spring motor is rewound.

25. A device as in claim 18 in which the means to close the switch means is a cam carried by the locking member.

References Cited in the file of this patent

UNITED STATES PATENTS

| | | |
|---|---|---|
| 929,743 | Wooden | Aug. 3, 1909 |
| 1,311,447 | Holst et al. | July 29, 1919 |
| 2,398,133 | Cronholm | Apr. 9, 1946 |
| 2,441,185 | Brown et al. | May 11, 1948 |
| 2,465,582 | Fink | Mar. 29, 1949 |
| 2,571,795 | Tyler et al. | Oct. 16, 1951 |
| 2,759,561 | Bolsey | Aug. 21, 1956 |

FOREIGN PATENTS

| | | |
|---|---|---|
| 1,042,990 | France | June 10, 1953 |